US006007224A

United States Patent [19]
Jiao et al.

[11] Patent Number: 6,007,224
[45] Date of Patent: Dec. 28, 1999

[54] AUTOMOTIVE HEADLAMP REFLECTOR AND METHOD FOR ITS DESIGN

[75] Inventors: Jianzhong Jiao, Novi; Douglas F. Kreysar, West Bloomfield; Ben Wang, Farmington, all of Mich.

[73] Assignee: North American Lighting, Inc., Farmington Hills, Mich.

[21] Appl. No.: 08/893,707

[22] Filed: Jul. 11, 1997

Related U.S. Application Data

[60] Provisional application No. 60/038,651, Feb. 21, 1997, and provisional application No. 60/021,661, Jul. 12, 1996.

[51] Int. Cl.$^6$ ....... B60Q 1/04
[52] U.S. Cl. ....... 362/518; 362/516
[58] Field of Search ....... 362/516, 517, 362/518, 263, 304, 346

[56] References Cited

U.S. PATENT DOCUMENTS

| | | | |
|---|---|---|---|
| 4,195,245 | 3/1980 | Miyazawa | 313/113 |
| 4,210,841 | 7/1980 | Vodicka et al. | 313/221 |
| 5,299,101 | 3/1994 | Serizawa | 362/263 X |
| 5,432,685 | 7/1995 | Taksukawa et al. | 362/518 |
| 5,508,592 | 4/1996 | Lapatovich et al. | 315/248 |
| 5,510,967 | 4/1996 | Cushaine et al. | 362/261 |
| 5,577,833 | 11/1996 | English et al. | 362/297 |
| 5,598,497 | 1/1997 | Roller | 385/92 |

*Primary Examiner*—Stephen Husar
*Attorney, Agent, or Firm*—McDonnell Boehnen Hulbert & Berghoff

[57] ABSTRACT

A reflector for a headlamp is divided into zones depending on the sizes of the light source images produced by the various parts of the reflector. Those parts of the reflector that provide smaller image sizes are used to supply light to the higher intensity parts of the road pattern. This allows greater control over glare and is particularly useful for headlamps having high intensity discharge as a light source. In one embodiment, a larger reflector is trimmed to be smaller and yet to retain portions that provide the small light source images.

18 Claims, 5 Drawing Sheets

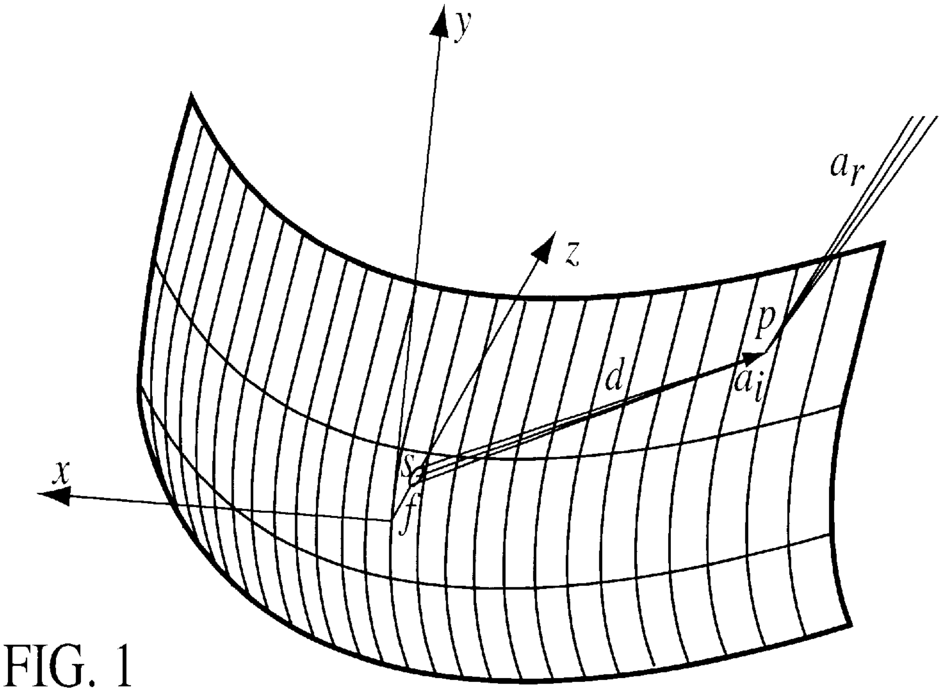
FIG. 1
FIG. 2
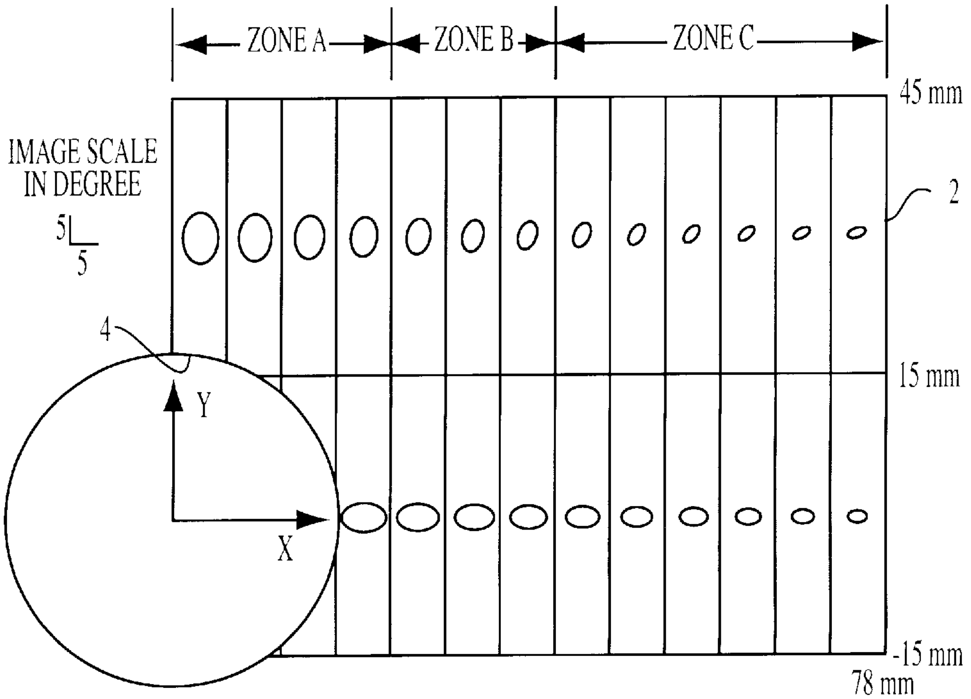

FIG. 4A
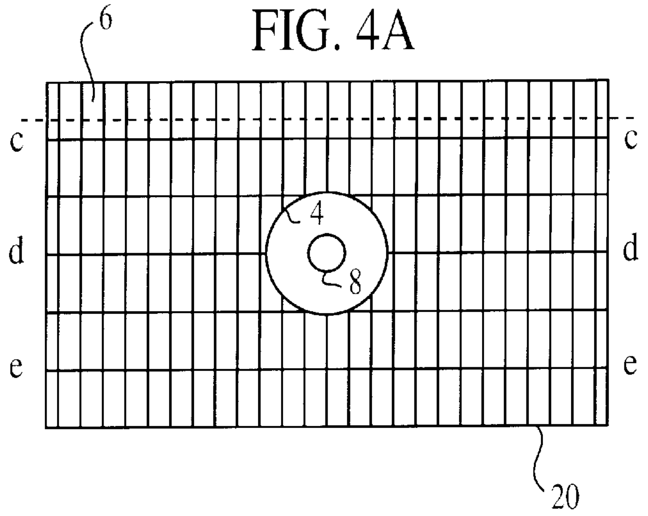
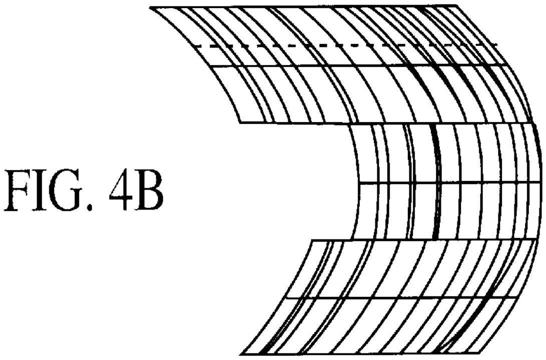
FIG. 4B
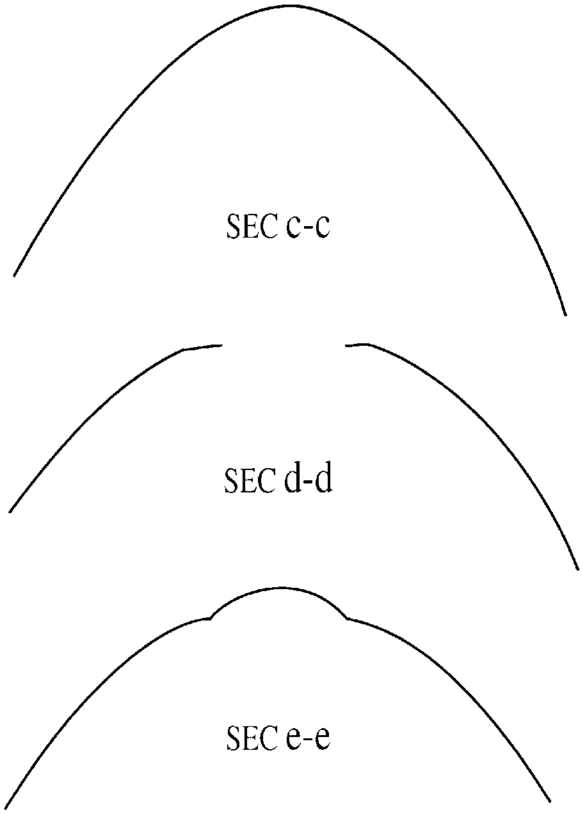
FIG. 4C

AUTOMOTIVE HEADLAMP REFLECTOR AND METHOD FOR ITS DESIGN

CROSS REFERENCE TO RELATED APPLICATIONS

This application claims priority of provisional applications 60/038,651 and 60/021,661.

TECHNICAL FIELD

This invention relates to the art of lighting, and in particular to the art of headlamps for automobiles and their design.

BACKGROUND

Styling and performance requirements have directed the automotive industry toward headlamps with clear lenses and reflector optics. Further, demand for increased headlamp performance has heightened interest in high intensity discharge (HID) light sources. Marriage of these two technologies into one product requires that several technical problems be overcome.

Two of the most difficult issues in designing reflector optics for a low-beam headlamp for use with an HID source are control of glare light and control of excess amounts of foreground light. These problems stem from the extended discharge area of the HID source, which is an ellipse of about 4.4 mm×4.4 mm×7.1 mm, compared to the typical tungsten halogen (TH) bulb, which is a cylinder 5.2 mm×1.2 mm. The extended discharge area of the HID source creates a large effective light source, which causes a large angular spread of light from a point on the reflector surface. This large angular spread can lead to excess amounts of glare light or foreground light.

The angular spread of light (i.e., the angular image size) from any point on the reflector depends on the size of the light source and the distance between the source and the point on the reflector. The image sizes produced by the reflector, however, can be controlled to some extent. For example, the image size can be decreased by increasing the distance between the light source and the point on the reflector.

SUMMARY OF THE INVENTION

Different parts of a reflector produce images of different sizes and intensity. Generally, points on the reflector that are further from the source of light produce smaller images and lower light intensities. Similarly, points nearer the light source produce larger images and have greater intensities. When the reflector is nominally of parabolic shape but with individual facets for directing individual parts of the image to desired locations in the light pattern, it is possible to specify the shape of each facet such that characteristics of the individual images are correlated with the characteristics of selected portions of the desired light pattern.

In general, the light pattern required for automotive lighting has a well defined region of greater intensity and other regions of lower intensity, but which cover a broader area. This required pattern is obtained in accordance with the invention by shaping the facets of the reflector to directing the smaller images of the source to the smaller part of the light pattern and using the larger images for the larger areas. As well, the areas of the pattern that require more light (lumens) are formed by the facets producing images carrying more light. This allows greater control of the light pattern.

In accordance with the invention, a reflector that is nominally parabolic with individual facets is divided into zones of these facets. These zones are defined by the respective sizes of the images of the light source generated by the facets and the amount of light contained in the images. Then, the shapes of the facets are designed such that light from the images having the smaller sizes is used for the smaller, higher intensity portion of the light pattern, and light from images having larger sizes is used for horizontal image spread. In the preferred embodiment, the facets are divided into three zones, with the facets of the zone providing intermediate image sizes being used for smoothing the light pattern.

When the reflector is divided into zones, a decision criteria in accordance with one embodiment of the invention divides the facets into three zones, A, B, and C. Zone A includes facets that will supply from 30% to 50% of the light in the pattern, zone B will supply from 25% to 45% of the light in the pattern, and zone C will supply 10% to 35% of the light in the pattern. In addition, the facets in zone A are selected to be the ones that will provide image sizes larger than 6°, the facets in zone B provide images sizes between 3° and 6°, and the facets in zone C provide image sizes smaller than 3°, each of these dimensions being variable by ±1°.

The reflector contemplated in the preferred embodiment of the invention is a nominally parabolic reflector that is trimmed to be a given shape, e.g., rectangular, when viewed from the front. In one embodiment, the light source is located in the geometric center of the reflector, in which case the three zones of facets are generally symmetrical about the light source. This may be the case, for example, when the reflector is 90 mm in height and 150 mm in width.

It is often required, however, that the reflector be made smaller. The smaller reflector presents the problem that the if the light source is centrally located, the distances between the source and the reflector will not be large enough to provide an adequate population of facets that produce the smaller images. That is, there are too few facets that provide an image size less than 3°. This makes it very difficult to provide adequate definition for certain regions in the light pattern, such as the "hot spot." Thus, in accordance with a second embodiment of the invention, the position of the light source with respect to the reflector is selected to provide the optimum mix of image sizes and light intensities. This then provides the designer with the tools for generating the required light pattern.

This second embodiment is particularly useful when the size of the reflector must be reduced to fit a physical restraint in an automobile, such as a small opening. If a reflector of a given curvature were reduced in size symmetrically, many of the facets producing small image sizes would be eliminated. If the size is reduced asymmetrically, however, many of the facets that produce small image sizes can be retained. This asymmetrical reduction in size results in the light source being displaced from the geometric center of the reflector.

BRIEF DESCRIPTION OF THE DRAWINGS

FIG. 1 is a diagram of light rays emanating from a light source and reflecting from a head lamp reflector.

FIG. 2 is a diagram of a reflector showing a variation in image sizes.

FIG. 4*a* is a front view, to scale, of one embodiment of a reflector in accordance with the invention.

FIG. 4*b* is a side view of the reflector of FIG. 4*a*.

FIG. 4*c* shows the curvature of the reflector of FIG. 4*a* along the line C—C of FIG. 4*a*.

FIG. 4*d* shows the curvature of the reflector of FIG. 4*a* along the line D—D of FIG. 4*a*.

FIG. 4*e* shows the curvature of the reflector of FIG. 4*a* along the line E—E of FIG. 4*a*.

FIG. 5*d* shows the curvature of the reflector of FIG. 5*a* along the line D—D of FIG. 5*a*.

FIG. 5*e* shown the curvature of the reflector of FIG. 5*a* along the line E—E of FIG. 5*a*.

DETAILED DESCRIPTION OF THE PREFERRED EMBODIMENTS

Figure 3:
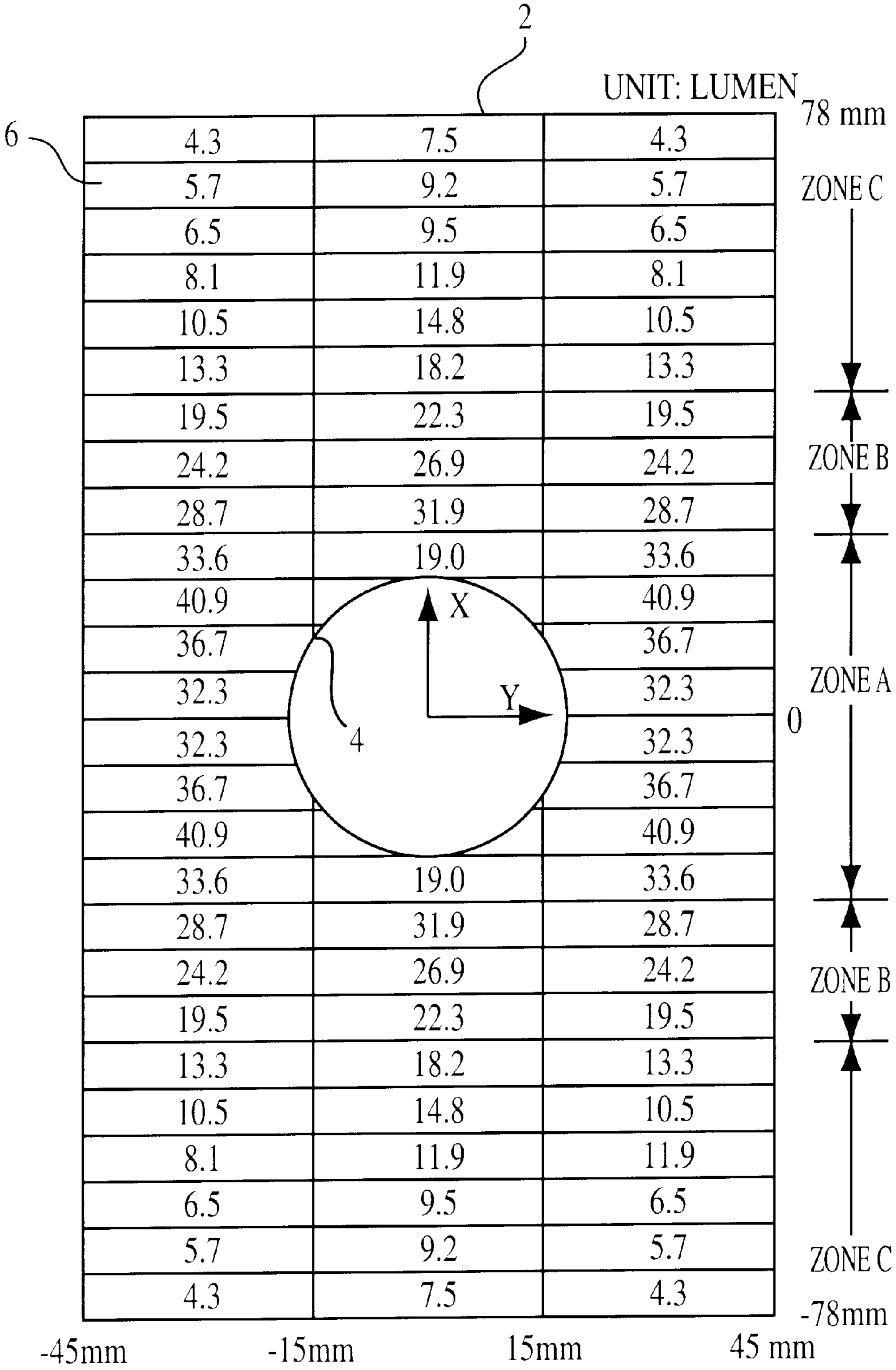
FIG. 3 is a diagram of a reflector showing the variation in light collected from a high intensity light source by each of the facets.

FIG. 1 illustrates the geometry of a head lamp reflector and shows the reflection of light rays from a source S at an arbitrary point P on the reflector. A reflector can be considered an imaging device. If only specular reflection is assumed, images of a light source (filament or arc) are formed by each point on the reflector. When the light source geometry and location are defined, the image varies with respect to the points on the reflector. In geometric optics, the relationship between object, image and reflecting surface can be described using vector notations.

Referring to FIG. 1, let $a_i$ be the direction of light from the light source S and incident of a surface, $a_r$ be the direction of light reflected from the surface, and n be the normal to the surface at the point of incidence. The vectors $a_i$, $a_r$, and n are unit vectors. For specular reflections, Snell's Law states that $$ai\cdot n=ar\cdot n \tag{1}$$

where the vectors $a_i$, $a_r$, and n are coplanar, which means that $a_i$, $a_r$, and n are linearly dependent:

$$-ai+ar=rn \tag{2}$$

where r is a coefficient.

For a given reflector, if the center of the light source is located at point (0,0,f) and extends from $-1_x$ to $1_x$, $-1_y$ to $1_y$, and $-1_z$ to $1_z$, then ($\Delta$1x, $\Delta$1y, f+$\Delta$1z) can represent an arbitrary point of the light source. The value for the incident vector from an arbitrary point of the light source to an arbitrary point on the reflector, p, can written $$a_i=\left(\frac{p_x-\Delta 1_x}{d},\ \frac{p_y-\Delta 1_y}{d},\ \frac{p_z-f-\Delta 1_z}{d}\right) \tag{3}$$

where $$d=[(p_x-\Delta 1_x)^2+(p_y-\Delta 1_y)^2+(p_z-f-\Delta 1_z)^2]^{1/2} \tag{4}$$

At the center of light source, $$a_i=\left(\frac{p_x}{d},\ \frac{p_y}{d},\ \frac{p_z-f}{d}\right) \tag{5}$$

For simplicity, the reflector is approximated as a parabola with the center of the light source filament on the focal point (i.e., the light is reflected straight ahead from the reflector surface), so that $a_r$=(0,0,1). That is approximately the case for the high intensity area of a low beam head lamp centered at 2R 1.5D, which is near the areas of greatest concern for both excess glare light and excess foreground light. The normal of surface is thus $$rn=-a_i+a_r$$

$$=\left(\frac{-p_x}{d},\ \frac{-p_y}{d},\ \frac{d-p_z+f}{d}\right). \tag{6}$$

Solving for n and normalizing, we obtain for a parabolic surface:

$$n=\left(\frac{-p_x}{[p_x^2+p_y^2+(d-p_z+f)^2]^{1/2}}\right),\ \left(\frac{-p_y}{[p_x^2+p_y^2+(d-p_z+f)^2]^{1/2}}\right),\ \left(\frac{d-p_z+f}{[p_x^2+p_y^2+(d-p_z+f)^2]^{1/2}}\right). \tag{7}$$

The direction of reflection for any point or light source is $$a_r=a_i-2n\ (a_i\cdot n)=(I-2E)_{ai} \tag{8}$$

where $$I=\begin{pmatrix}1&0&0\\0&1&0\\0&0&1\end{pmatrix}, \tag{9}$$

and $$E=\begin{pmatrix}n_x^2&n_xn_y&n_xn_z\\n_yn_x&n_y^2&n_yn_z\\n_zn_x&n_zn_y&n_z^2\end{pmatrix}, \tag{10}$$

Finally, $$(a_{r_x},a_{r_y},a_{rz})^T=\begin{pmatrix}-2n_x^2+1&-2n_xn_y&-2n_xn_z\\-2n_yn_x&-2n_y^2+1&-2n_yn_z\\-2n_zn_x&-2n_zn_y&-2n_z^2+1\end{pmatrix} \tag{11}$$

$(a_{ix}, a_{iy}, a_{iz})$.

Equation (11) determines the vector of the reflecting rays from any point on the reflector, ($p_x$, $p_y$, $p_z$), given the incident ray vector, $a_i$. For any point of the light source, the incident ray vector, $a_i$, can be calculated by using equation (3). Thus given an arbitrary point on the reflector and an arbitrary origination point in the light source, the above provides a method to calculate $a_r$. By calculating $a_r$ for light source points at a specific reflector point one can calculate an image size (in degrees) for that specific reflector point. The image size of the HID light source for a reflector using a 24 mm "focal distance" has been calculated. The results are shown in FIG. 2.

FIG. 2 shows the upper right hand portion of a reflector 2 in elevation and illustrates the image sizes produced by the reflector for light from a high intensity discharge source. The width of the portion shown in FIG. 2 is 78 mm, and the height is 60 mm. The opening 4 in the reflector for receiving the light source is centrally located with respect to the entire reflector. As shown in FIG. 2, the images sizes created by the reflector are smaller for those portions of the reflector that are farther from the light source.

FIG. 3 illustrates that the intensity of the light contained in the images also decreases for the areas farther from the light source. Thus, FIG. 3 illustrates the lumen content for the images produced by individual facets in a reflector.

FIGS. 2 and 3 also indicate the boundaries of the zones A, B, and C into which the reflector is divided during the design process. These zones define the facets 6 to be used for the high intensity part of the light pattern, the lower intensity part of the light pattern, and for smoothing the pattern. In the preferred embodiment, the zones are defined in accordance with the following criteria:

| Zone | A | B | C |
|---|---|---|---|
| Portion of total light | 40% | 35% | 25% |
| Filament size (°) | >6 | 3–6 | <3 |

The facets in zone A are used to supply the light for the broader and lower intensity parts of the light pattern, the facets in zone C are used to supply the light for the smaller and higher intensity part of the light pattern, and the facets in zone B are used to supply light to smooth the light pattern.

FIG. 4*a* shows an embodiment of the invention where the reflector is divided into seventy-eight facets 6 arranged in twenty-six columns and three rows. The reflector is one hundred fifty six millimeters in width and ninety millimeters in height. The zones are symmetrical about the high intensity discharge light source 8, and zone A extends from the light source to about 24 mm on either side of the source. Zone B extends from the outer boundary of zone A to about 42 mm on either side of the light source, and zone C extends from the outer boundary of zone B to the outer edges of the reflector.

FIG. 4*b* is a side view of the reflector of FIG. 4*a,* and FIGS. 4*c* through 4*e* show the curvature along the lines C—C, D—D, and E—E, respectively.

Figure 5A:
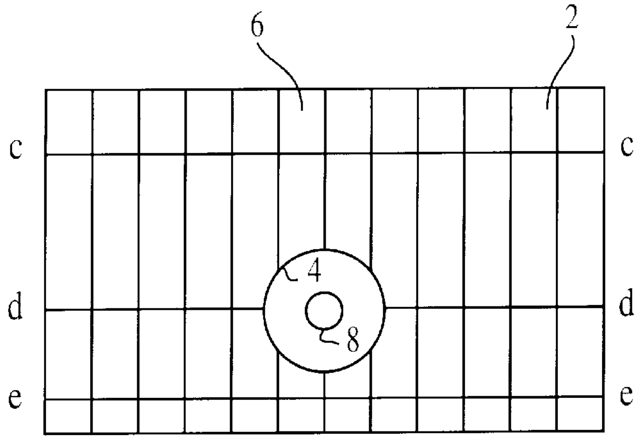
FIG. 5*a* is a front view, to scale, of a second embodiment of a reflector in accordance with the invention.

FIG. 5*a* illustrates a second embodiment of a reflector in accordance with the invention. In accordance with this embodiment, the reflector contains twelve vertical facets and is not symmetrical with respect to the geometry of the lens. The width of the reflector of FIG. 5*a* is about one hundred sixty millimeters, and the height is about eighty millimeters. The light source 8 is centrally located with respect to the width and about thirty millimeters from the lower edge of the reflector. The zones are symmetrical about the light source in the horizontal direction; zone A extends about 35 mm on either side of the source; zone B extends from the outer boundary of zone A to about 55 mm on either side of the source; zone C extends from the outer boundary of zone B to the outer edges of the reflector.

Figure 5B:
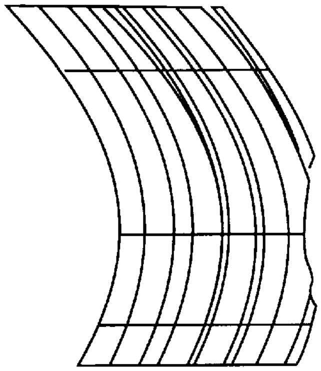
FIG. 5*b* is a side view of the reflector shown in FIG. 5*a*.
Figure 5C:
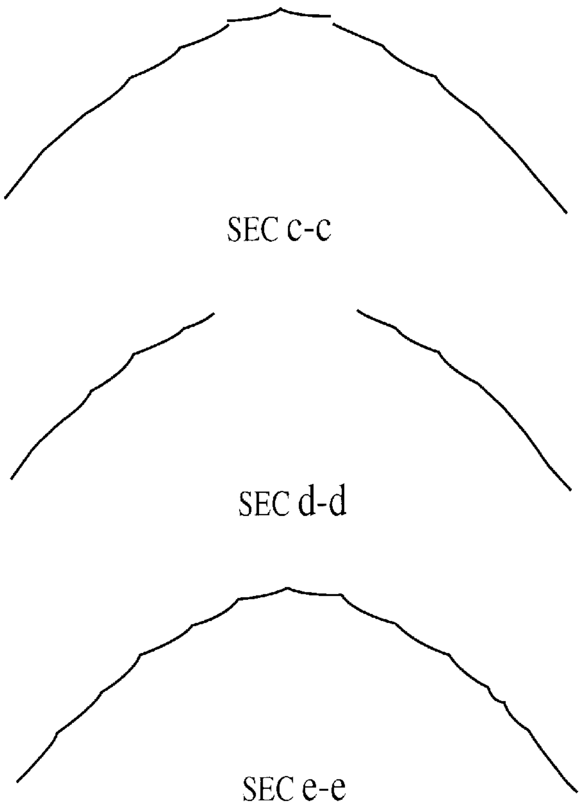
FIG. 5*c* shows the curvature of the reflector of FIG. 5*a* along the line C—C of FIG. 5*a*.

FIG. 5*b* is a side view of the reflector of FIG. 5*a* and FIGS. 5*c* through 5*e* show the curvatures along lines C—C, D—D, and E—E.

Figure 6:
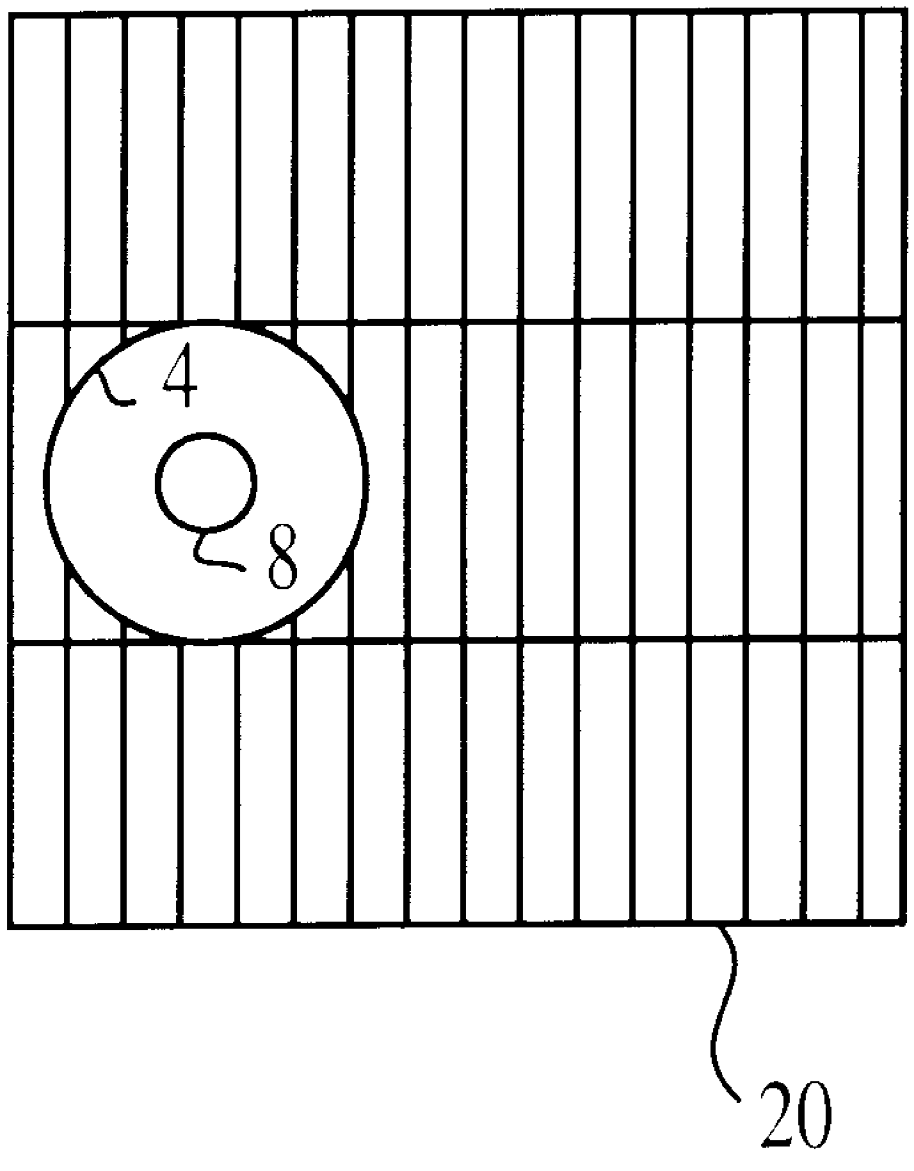
FIG. 6 shows a third embodiment of a reflector in accordance with the invention.

FIG. 6 shows a further embodiment wherein the reflector of FIG. 4*a* had been modified by trimming zones B and C on the left side of the reflector (when viewed from the front) from the reflector. This results in a reflector that is physically smaller than the reflector shown in FIG. 4*a* but, by retaining the facets of zones B and C on the right side of the reflector, retains the ability of the designer to provide light of small image sizes to the higher intensity parts of the light pattern. The physical geometry of the resulting new reflector is such that the light source is geometrically off-center. In the design method associated with this embodiment, a symmetrical reflector, such as that shown in FIG. 4*a,* is made to fit a smaller prescribed geometry while retaining the desirable light pattern associated with the larger reflector by retaining a large number of facets in zones B and C on the right side of the reflector. This greatly simplifies the design process and produces a reflector with superior properties.

Modifications within the scope of the appended claims will be apparent to those of skill in the art.

We claim:

1. A headlamp for producing a lighting pattern having a region of higher intensity and a region of lower intensity comprising:

a reflector having a generally parabolic shape and divided into a plurality of individual facets for directing light from a light source into a predetermined lighting pattern, and a high intensity discharge light source for directing light onto said reflector, wherein said facets are shaped such that facets located further from said high intensity discharge light source direct light into said region of higher intensity and are facets for producing images of said light source having angular sizes of less than about 3° and facets located closer to said high intensity discharge light source direct light into said region of lower intensity.

2. A headlamp according to claim 1 wherein said facets located closer to said high intensity discharge light source are facets for producing images of said light source having angular sizes of greater than about 6°.

3. A headlamp according to claim 2 wherein said facets located closer to said light source comprise zone A facets, said facets located farther from said light source comprise zone C facets, and said reflector further comprises zone B facets located between the facets of zone A and the facets of zone C, and wherein the facets of zone B produce images of said light source having angular sizes of greater than about 3° and less than about 6°.

4. A headlamp according to claim 3 wherein the facets of zone A supply from 30% to 50% of the total light in said lighting pattern, the facets of zone B supply from 25% to 45% of the total light in said lighting pattern, and the facets of zone C supply from 10% to 35% of the total light in said lighting pattern.

5. A headlamp according to claim 4 wherein said facets of zone A supply about 40% of the total light in said lighting pattern, said facets of zone B supply about 35% of the total light in said lighting pattern, and said facets of zone C supply about 25% of the total light in said lighting pattern.

6. A headlamp according to claim 1 wherein said high intensity discharge light source is positioned at a geometric center of a front view of said reflector.

7. A head lamp according to claim 6 wherein said elevation projection of said reflector is rectangular.

8. A headlamp according to claim 1 wherein said high intensity discharge light source is not at a geometric center of a front view of said reflector.

9. A headlamp according to claim 8 wherein said elevation projection of said reflector is rectangular.

10. A method for designing a reflector for a headlamp having a high intensity discharge source of light comprising the steps of:

providing a specification for said reflector wherein said reflector is divided into a plurality of facets and providing a specification of the shape of each of said facets for forming a desired headlamp pattern having a region of higher light intensity and a region of lower light intensity, the specification provides that facets farther from said light source are for supplying light to said region of higher light intensity and the specification provides that facets closer to said light source are for supplying light to said region of lower light intensity;

wherein the specification provides that said facets located closer to a light source comprise zone A facets, said facets located farther from said light source comprise zone C facets, and facets located between the facets of zone A and the facets of zone C comprise zone B facets, and wherein the facets of zone A produce images of said light source having angular sizes of greater than about 6°, the facets of zone B produce images of said light source having angular sizes of greater than about 6°, the facets of zone B produce images of said light source having angular sizes of greater than about 3° and less than about 6°, and the facets of zone C produce images of said light source having angular sizes of less than about 3°, and wherein the specification provides that facets of zone A are used to supply light to the region of lower light intensity, the facets of zone C are used to supply light to the region of higher light intensity, and the facets of zone B are used to supply light to smooth said lighting pattern.

11. A method according to claim 10 wherein the facets of zone A supply from 30% to 50% of the total light in said lighting pattern, the facets of zone B supply from 25% to 45% of the total light in said lighting pattern, and the facets of zone C supply from 10% to 35% of the total light in said lighting pattern.

12. A method according to claim 11 wherein said facets of zone A supply about 40% of the total light in said lighting pattern, said facets of zone B supply about 35% of the total light in said lighting pattern, and said facets of zone C supply about 25% of the total light in said lighting pattern.

13. A method for designing a reflector for a headlamp comprising the steps of:

providing a specification for said reflector wherein said reflector is divided into a plurality of facets and providing a specification of the shape of each of said facets for forming a desired headlamp lighting pattern having a region of higher intensity and a region of lower light intensity, wherein the specification provides that said facets located closer to a light source comprise zone A facets, said facets located farther from said light source comprise zone C facets, and said facets located between the facets of zone A and the facets of zone C comprise zone B facets, and wherein the facets of zone A produce images of said light source having angular sizes of greater than about 6°, the facets of zone B produce images of said light source having angular sizes of greater than about 3° and less than about 6°, and the facets of zone C produce images of said light source having angular sizes of less than about 3° and wherein the specification provides that facets of zone A are used to supply light to the region of lower light intensity, the facets of zone C are used to supply light to the region of higher light intensity, and the facets of zone B are used to supply light to smooth said lighting pattern.

14. A method according to claim 13 wherein the facets of zone A supply from 30% to 50% of the total light in said lighting pattern, the facets of zone B supply from 25% to 45% of the total light in said lighting pattern, and the facets of zone C supply from 10% to 35% of the total light in said lighting pattern.

15. A method according to claim 14 wherein said facets of zone A supply about 40% of the total light in said lighting pattern, said facets of zone B supply about 35% of the total light in said lighting pattern, and said facets of zone C supply about 25% of the total light in said lighting pattern.

16. A method according to claim 15 wherein said light source is a high intensity discharge light source.

17. A method for designing a reflector for a headlamp comprising the steps of:

providing an initial specification for said reflector wherein said reflector is divided into a plurality of facets and providing an initial specification of the shape of each of said facets for forming a desired headlamp pattern having a region of higher light intensity and a region of lower light intensity, wherein said initial specification provides that a light source is at the geometric center of said reflector and that facets farther from said light source are for supplying light to said region of higher light intensity and the specification provides that facets closer to said light source are for supplying light to said region of lower light intensity, and providing a second specification by eliminating from said initial specification at least some of said facets farther from said light source on one side of said reflector while retaining the relative position of said light source with respect to the remaining facets such that said light source is not at the geometric center of the reflector defined by said second specification.

18. A method according to claim 17 wherein said initial specification provides that said facets located closer to a light source comprise zone A facets, said facets located farther from said light source comprise zone C facets, and facets located between the facets of zone A and the facets of zone C comprise zone B facets, and wherein the facets of zone A produce images of said light source having angular sizes of greater than about 6°, the facets of zone B produce images of said light source having angular sizes of greater than about 3° and less than about 6°, and the facets of zone C produce images of said light source having angular sizes of less than about 3°, and wherein the specification provides that facets of zone A are used to supply light to the region of lower light intensity, the facets of zone C are used to supply light to the region of higher light intensity, and the facets of zone B are used to supply light to smooth said lighting pattern, and said step of eliminating at least some of said facets comprises eliminating at least some of the facets of zone C from one side of said reflector.

* * * * *